C. A. RIVERS.
AUTOMATIC AIR DEVICE FOR GAS ENGINES.
APPLICATION FILED JUNE 19, 1918.
Reissued Dec. 10, 1918.
14,561.
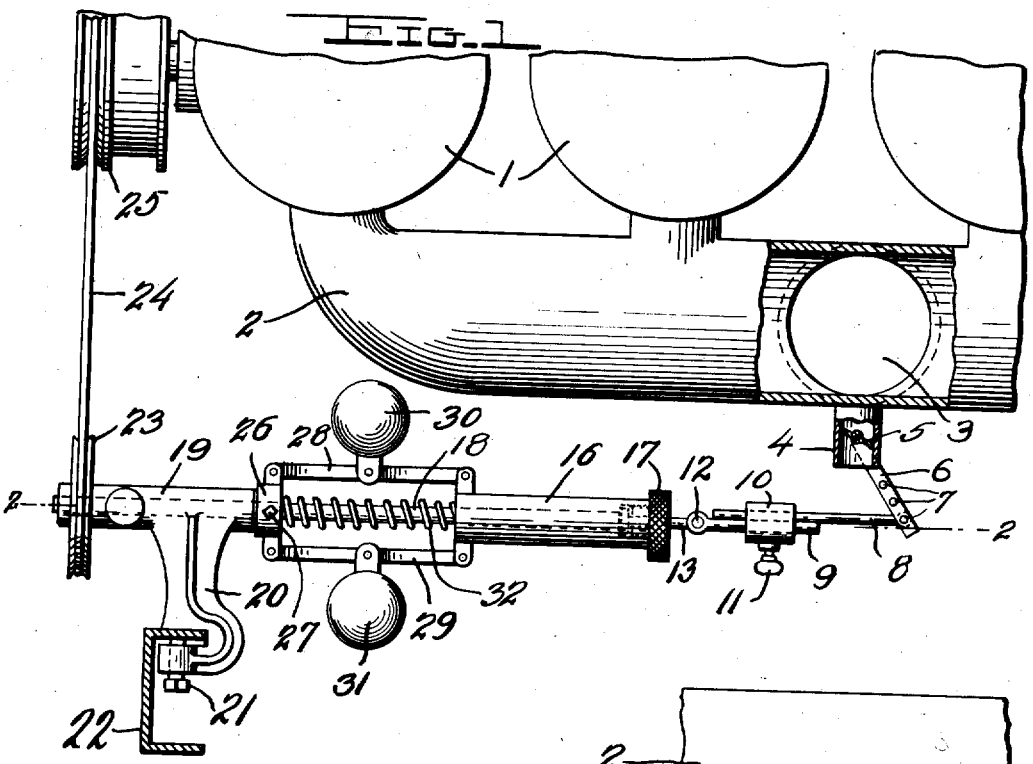
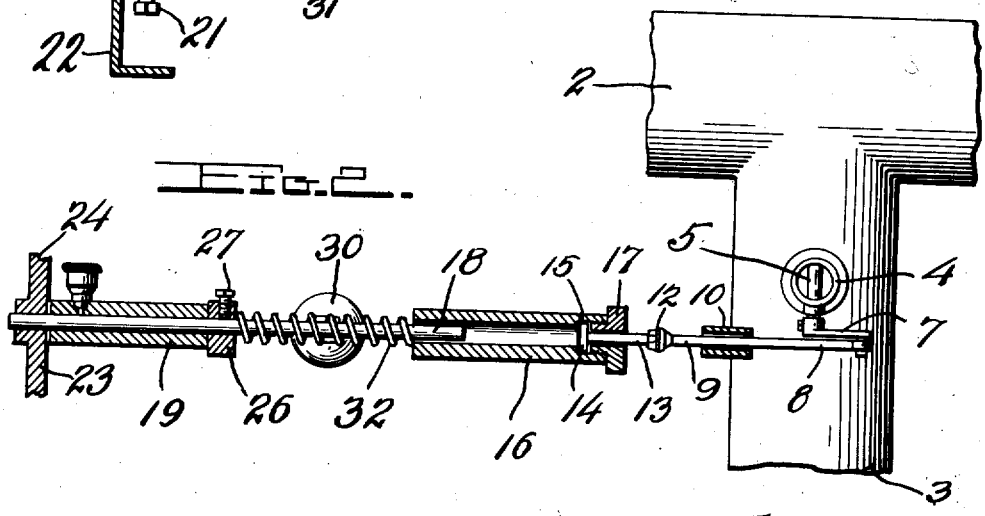
Inventor:
Charles A. Rivers
by C. P. Goepel
atty.

UNITED STATES PATENT OFFICE.

CHARLES A. RIVERS, OF EL PASO, TEXAS.

AUTOMATIC AIR DEVICE FOR GAS-ENGINES.

14,561. Specification of Reissued Letters Patent. Reissued Dec. 10, 1918.

Original No. 1,221,597, dated April 3, 1917, Serial No. 46,944, filed August 23, 1915. Application for reissue filed June 19, 1918. Serial No. 240,856.

*To all whom it may concern:*

Be it known that I, CHARLES A. RIVERS, a citizen of the United States, residing at El Paso, in the county of El Paso and State of Texas, have invented certain new and useful Improvements in Automatic Air Devices for Gas-Engines; and I do hereby declare the following to be a full, clear, and exact description of the invention, such as will enable others skilled in the art to which it appertains to make and use the same.

The present invention relates to improvements in automatic air devices for gas engines, and has for an object to provide an improved device for introducing air into a trunk arranged between the intake manifold of the engine and the carbureter, and which will proportion the amount of air to correspond with the increased speed of the engine.

Another object of the present invention resides in providing a device of the above character which will be assembled on a frame adapted for removable attachment to the framework of automobiles, or the like vehicles, and the several parts whereof will be simple in construction, readily assembled, and adjustable to fit various styles of cars and valves.

Reference is had to the accompanying drawings, in which similar parts are indicated by similar reference symbols throughout the several views.

Figure 1 is a fragmentary top plan view, partly in section, of a gas engine illustrated as equipped with an automatic air device constructed in accordance with the present invention; and Fig. 2 is a fragmentary view of the intake manifold and automatic air device illustrated in section.

Referring more particularly to the drawings, 1 designates the cylinders of a gas engine, and 2 the intake manifold of the same. The intake manifold 2 is in communication with the carbureter (not shown) by a trunk 3, in which is situated an air inlet 4 under the control of a butterfly or other valve 5.

The valve 5 is connected to be actuated by an arm 6 in which is produced a series of perforations 7 for connection by one end of a rod 8 constituting, with a second rod 9, an adjustable link. The two rods 8 and 9 of the link are slidably connected together by a collar 10, provided with a clamp screw 11 for securing the rods in adjusted position. The opposite end of the rod 9 is connected, as indicated at 12, to a stem 13 which latter is provided with a head 14, more particularly seen in Fig. 2, and said head 14 is arranged to be received into a recess 15 in a sliding sleeve 16, and confined therein by a threaded plug or other suitable means 17.

The sleeve 16 is slidably mounted over one end of a shaft 18, journaled in a bearing 19 formed on a frame 20, provided with a clamp 21 for detachable connection to the framework of an automobile or other vehicle, indicated at 22. The shaft 18 is provided with a pulley or other gear element 23, over which is trained a belt 24 running over a similar pulley 25 on the crank or other shaft of the engine 1.

Between a collar 26, secured by a set screw 27 to the shaft 18, and the slidable sleeve 16 are arranged pairs of inter-connected arms 28 and 29, coupled centrally to balls or weights 30 and 31 respectively; the same constituting a centrifugal governor. On the shaft 18 is a coil spring 32, confined between the collar 26 and sliding sleeve 16 and normally operating to move the sleeve 16 into the position shown in the drawings.

In operation as the engine rotates, through the belt 24, the same will act to similarly rotate the shaft 18 carrying with the same the centrifugal governor. As the speed of the engine increases the weights or balls 30 and 31 of the centrifugal governor will draw the sliding sleeve 16 in opposition to the action of the coil spring 32 to the left as shown in the drawings, carrying with the same the rods 8 and 9 and arm 7, thereby moving the valve 5 to open position. As the speed of the engine increases this operation of the governing mechanism will continue, and the valve 5 will be opened wide to permit the engine to draw in air from the atmosphere, which will be mixed with the incoming charge and promote a more homogeneous mixture and better combustion in the engine cylinders.

When the speed of the engine falls, the spring 32 will overcome the centrifugal action of the balls 30 and 31 and will return the sleeve 16 to the right, thus closing down the valve 5 and gradually shutting off and closing communication with the atmosphere.

It will be noted that the sleeve 16 and plug 17 rotate with the governor, while the stem 13 and rods 8 and 9 are non-rotatable, but are connected to reciprocate through the head 14 which occupies the recess 15. The adjustable clamp 10 and 11 permits the rods 8 and 9 to be moved to increase or decrease the length of the link, and the perforations 7 are adapted to attach the link to the arm 7 at a proper point to secure the desired throw.

I have illustrated and described preferred and satisfactory constructions, but obviously changes could be made in the combination and arrangement of parts without departing from the spirit of my invention.

Having thus described my invention, what I claim and desire to secure by Letters Patent of the United States is:—

1. In a gas engine having a rotor, a manifold and a carbureter, the improved automatic air device consisting of the combination of a normally closed butterfly valve on the manifold openable directly to the atmosphere and to the incoming charge passing to the manifold for establishing a direct connection between the incoming charge and the atmosphere, said butterfly valve being operable independently of the carbureter air inlet valve and operable independently of the incoming charge and without obstructing the incoming charge to the manifold, and means connected with the rotor for opening the butterfly valve with the increased speed of the rotor to permit the engine to draw in from the atmosphere additional air at the manifold to mix directly with the incoming charge as it enters the manifold to permit a more homogeneous mixture and better combustion in the engine, and for closing the additional butterfly valve as the speed of the rotor decreases.

2. In a gas engine having a rotor, a carbureter, an intake manifold and a trunk arranged between the intake manifold and the carbureter, the improved automatic air device consisting of an additional atmospheric air inlet directly on said trunk adjacent the manifold and open to and in direct communication with the atmosphere, a normally closed butterfly valve for the inlet and on said trunk closely adjacent the manifold and practically in said manifold, openable directly to the atmosphere for establishing a direct communication between the atmosphere and the incoming charge passing to the manifold, said butterfly valve being independent of that of the carbureter air inlet valve and independent of the incoming charge to the manifold and without obstructing the incoming charge to the manifold, and means connected to the rotor of the engine for opening the additional atmospheric air inlet butterfly valve in said trunk for increasing the proportion of the additional amount of atmospheric air directly from the atmosphere into said trunk to correspond with the increased speed of the rotor for permitting a more homogeneous mixture and better combustion in the engine, and for closing the additional atmospheric air inlet butterfly valve as the speed of the rotor decreases.

3. In a gas engine having a rotor, a manifold and a carbureter, the improved automatic air inlet device consisting of an atmospheric air inlet directly in the manifold adjacent directly to the atmosphere, and a normally closed additional atmospheric air inlet butterfly valve in the air inlet of the manifold, closely adjacent to the incoming charge passing to the manifold and practically in the manifold so that air may pass instantaneously from the atmosphere unobstructively into the incoming charge passing to the manifold, said butterfly valve being operable independently of the carbureter air inlet, and operable independently of the incoming charge passing to the manifold, and having permanent unobstructed connection with the manifold, said butterfly valve openable to admit additional atmospheric air directly from the atmosphere to the incoming charge for increasing the proportion of air to the incoming charge as it enters the manifold to correspond to the increased speed of the rotor and permit a more homogeneous mixture and better combustion in the engine, said butterfly valve being closable to reduce or cut off the supply of additional atmospheric air controlled by said butterfly valve as the speed of the rotor decreases.

4. In a gas engine having a rotor, a manifold, and a carbureter, the combination with an additional atmospheric air inlet pivoted butterfly valve for the manifold and an arm connected thereto, of a detachable attachment consisting of means connected with the arm, a rotary shaft, means for rotating said shaft, a centrifugal governing mechanism on said shaft and connected with said means, shifting the latter to rock said butterfly valve, a spring opposing the action of said centrifugal governor, a bearing for the rotary shaft, and a clamping device on the bearing for clamping the bearing to the framework of the gas engine, whereby the attachment may be detachably attached to the framework of the gas engine.

In testimony whereof, I affix my signature.

CHARLES A. RIVERS.